United States Patent
Prather et al.

(10) Patent No.: US 7,826,581 B1
(45) Date of Patent: Nov. 2, 2010

(54) LINEARIZED DIGITAL PHASE-LOCKED LOOP METHOD FOR MAINTAINING END OF PACKET TIME LINEARITY

(75) Inventors: Stephen M. Prather, Austin, TX (US); Matthew S. Berzins, Austin, TX (US); Charles A. Cornell, Austin, TX (US); Steven P. Larky, Del Mar, CA (US); Joseph A. Cetin, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1249 days.

(21) Appl. No.: 10/959,259

(22) Filed: Oct. 5, 2004

(51) Int. Cl.
*H03D 3/24* (2006.01)
(52) U.S. Cl. ...................... 375/373; 375/376
(58) Field of Classification Search .............. 375/373, 375/374, 375, 376
See application file for complete search history.

(56) References Cited

U.S. PATENT DOCUMENTS

| | | | |
|---|---|---|---|
| 3,721,913 A | 3/1973 | Theobald | |
| 4,151,485 A | 4/1979 | LaFratta | |
| 4,330,759 A | 5/1982 | Anderson | |
| 4,523,301 A | 6/1985 | Kadota et al. | |
| 4,672,447 A | 6/1987 | Moring et al. | |
| 4,862,411 A | 8/1989 | Dishon et al. | |
| 4,970,609 A | 11/1990 | Cunningham et al. | |
| 4,989,223 A | 1/1991 | Katayose et al. | |
| 5,057,771 A | 10/1991 | Pepper | |
| 5,059,924 A | 10/1991 | JenningsCheck | |
| 5,161,173 A | 11/1992 | Nordby | |
| 5,295,155 A | 3/1994 | Gersbach et al. | |
| 5,343,439 A | 8/1994 | Hoshino | |
| 5,493,243 A | 2/1996 | Ghoshal | |
| 5,568,416 A | 10/1996 | Kawana et al. | |
| 5,596,575 A | 1/1997 | Yang et al. | |
| 5,671,258 A | 9/1997 | Burns et al. | |
| 5,687,203 A | 11/1997 | Baba | |
| 5,742,602 A | 4/1998 | Bennett | |
| 5,745,530 A | 4/1998 | Baek et al. | |
| 5,757,652 A | 5/1998 | Blazo et al. | |
| 5,757,858 A | 5/1998 | Black et al. | |
| 5,761,254 A | 6/1998 | Behrin | |

(Continued)

OTHER PUBLICATIONS

Cypress Preliminary CY7C68013A/CY7C68015A EZ-UB FX2LP™ USB Microcontroller High-Speed USB Peripheral Controller, Document # 38-08032 Rev. *E, Revised Jun. 8, 2004, 63 pages.

(Continued)

*Primary Examiner*—Chieh M Fan
*Assistant Examiner*—Jaison Joseph

(57) ABSTRACT

An apparatus and method are disclosed synchronization of a clock signal to a data signal. The apparatus includes a phase lock and tracking logic circuit configured to detect a plurality of values. Each of the plurality of values indicates a position of a data edge of the data signal. The phase lock and tracking logic circuit adds the plurality of values to generate a result and to adjust the clock signal if the result is greater than a predetermined value, or threshold. The phase lock and tracking logic circuit may be configured to maintain the clock signal linearity approximately between the end of a first data packet and the beginning of a second data packet.

21 Claims, 8 Drawing Sheets

U.S. PATENT DOCUMENTS

| | | | |
|---|---|---|---|
| 5,812,617 | A | 9/1998 | Heckman et al. |
| 5,812,619 | A | 9/1998 | Rundaldue |
| 5,841,823 | A | 11/1998 | Tuijn |
| 5,841,985 | A | 11/1998 | Jie et al. |
| 5,861,842 | A * | 1/1999 | Hitch et al. ............ 342/357.15 |
| 5,864,250 | A | 1/1999 | Deng |
| 5,889,050 | A | 3/1999 | Fenske et al. |
| 5,889,436 | A | 3/1999 | Yeung et al. |
| 5,901,110 | A | 5/1999 | Jang |
| 5,910,742 | A | 6/1999 | Synder et al. |
| 6,041,065 | A | 3/2000 | Melvin |
| 6,055,241 | A | 4/2000 | Raza et al. |
| 6,064,236 | A | 5/2000 | Kuwata et al. |
| 6,081,561 | A | 6/2000 | Julyan et al. |
| 6,208,169 | B1 | 3/2001 | Wong et al. |
| 6,222,876 | B1 | 4/2001 | Hirth et al. |
| 6,229,811 | B1 | 5/2001 | Raza et al. |
| 6,236,696 | B1 | 5/2001 | Aoki et al. |
| 6,255,880 | B1 | 7/2001 | Nguyen |
| 6,259,755 | B1 * | 7/2001 | O'Sullivan et al. .......... 375/376 |
| 6,301,188 | B1 | 10/2001 | Weber et al. |
| 6,366,145 | B1 | 4/2002 | Williams et al. |
| 6,380,703 | B1 | 4/2002 | White |
| 6,385,267 | B1 | 5/2002 | Bowen et al. |
| 6,417,698 | B1 | 7/2002 | Williams et al. |
| 6,438,155 | B1 | 8/2002 | Beale |
| 6,477,279 | B2 | 11/2002 | Go |
| 6,529,457 | B1 | 3/2003 | Narumi et al. |
| 6,535,023 | B1 * | 3/2003 | Williams et al. ............... 327/24 |
| 6,587,531 | B1 | 7/2003 | De Mey et al. |
| 6,711,226 | B1 | 3/2004 | Williams et al. |
| 6,721,255 | B1 | 4/2004 | Gushima et al. |
| 6,760,389 | B1 | 7/2004 | Mukherjee et al. |
| 6,950,484 | B1 | 9/2005 | Jordan et al. |
| 6,993,105 | B1 | 1/2006 | Little et al. |

OTHER PUBLICATIONS

USPTO Notice of Allowance for U.S. Appl. No. 09/745,660 dated Sep. 24, 2001; 18 pages.
USPTO Non-Final Rejection for U.S. Appl. No. 09/745,660 dated Aug. 15, 2001; 8 pages.
USPTO Notice of Allowance for U.S. Appl. No. 09/747,281 dated Feb. 26, 2002; 20 pages.
USPTO Non-Final Rejection for U.S. Appl. No. 09/747,281 dated Oct. 31, 2001; 8 pages.
USPTO Notice of Allowance for U.S. Appl. No. 09/747,25 dated Jun. 27, 2005; 6 pages.
USPTO Advisory Action for U.S. Appl. No. 09/747,257 dated Apr. 27, 2005; 3 pages.
USPTO Final Rejection for U.S. Appl. No. 09/747,257 dated Feb. 11, 2005; 10 pages.
USPTO Non-Final Rejection for U.S. Appl. No. 09/747,257 dated Jul. 30, 2004; 9 pages.
USPTO Notice of Allowance for U.S. Appl. No. 09/747,262 dated Oct. 21, 2003; 11 pages.
USPTO Notice of Allowance for U.S. Appl. No. 09/746,802 dated Nov. 5, 2002; 16 pages.
USPTO Non-Final Rejection for U.S. Appl. No. 09/746,802 dated Jul. 17, 2002; 7 pages.
USPTO Notice of Allowance for U.S. Appl. No. 09/747,188 dated May 6, 2005: 6 pages.
USPTO Advisory Action for U.S. Appl. No. 09/747,188 dated Feb. 9, 2005; 3 pages.
USPTO Final Rejection for U.S. Appl. No. 09/747,188 dated Nov. 23, 2004; 8 pages.
USPTO Non-Final Rejection for U.S. Appl. No. 09/747,188 dated May 10, 2004; 6 pages.
USPTO Miscellaneous Action for U.S. Appl. No. 09/747,188 dated Feb. 26, 2001; 1 pages.
U.S. Appl. No. 09/745,660: "Linearized Digital Phase-Locked Loop," Williams et al.; filed Dec. 21, 2000; 25 pages.
U.S. Appl. No. 09/747,281: "Linearized Digital Phase-Locked Loop Method," Williams et al.; filed Dec. 21, 2000; 29 pages.
U.S. Appl. No. 09/747,257: "Linearized Digital Phase-Locked Loop," Little et al.; filed Dec. 22, 2000; 33 pages.
U.S. Appl. No. 09/747,262: "Linearized Digital Phase-Locked Loop," Williams et al.; filed Dec. 22, 2000; 27 pages.
U.S. Appl. No. 09/746,802: "Linearized Digital Phase-Locked Loop Method," Williams et al.; filed Dec. 22, 2000; 26 pages.
U.S. Appl. No. 09/747,188: "Linearized Digital Phase-Locked Loop Method," Jordan et al.; filed Dec. 22, 2000; 28 pages.
U.S. Appl. No. 08/877,683: "Circuit and Method for Data Recovery," Snyder et al.; filed Jun. 16, 1997; 21 pages.
U.S. Appl. No. 09/556,581: "Architecture for a Dual Segment Dual Speed Repeater," Raza et al.; filed Apr. 24, 2000; 25 pages.
USPTO Notice of Allowance for U.S. Appl. No. 08/877,683 dated Dec. 21, 1998; 11 pages.
USPTO Non-Final Rejection for U.S. Appl. No. 08/877,683 dated Aug. 4, 1998; 9 pages.
USPTO Notice of Allowance for U.S. Appl. No. 09/556,581 dated Dec. 19, 2000; 21 pages.
USPTO Non-Final Rejection for U.S. Appl. No. 09/556,581 dated Sep. 1, 2000; 9 pages.
U.S. Appl. No. 08/970,059: "Architecture for a Dual Segment Dual Speed Repeater," Raza et al.; filed Nov. 13, 1997; 36 pages.
U.S. Appl. No. 08/970,058: "Architecture for a Dual Segment Dual Speed Repeater," Raza et al.; filed Nov. 13, 1997; 33 pages.
USPTO Notice of Allowance for U.S. Appl. No. 08/970,059 dated Dec. 20, 1999; 21 pages.
USPTO Non-Final Rejection for U.S. Appl. No. 08/970,059 dated Sep. 10, 1999; 9 pages.
USPTO Notice of Allowance for U.S. Appl. No. 08/970,058 dated Sep. 18, 2000; 15 pages.
USPTO Non-Final Rejection for U.S. Appl. No. 08/970,058 dated Jun. 2, 2000; 5 pages.
USPTO Advisory Action for U.S. Appl. No. 08/970,058 dated Apr. 11, 2000; 8 pages.
USPTO Final Rejection for U.S. Appl. No. 08/970,058 dated Jan. 18, 2000; 8 pages.
USPTO Non-Final Rejection for U.S. Appl. No. 08/970,058 dated Sep. 15, 1999; 10 pages.
William Stallings, "Local & Metropolitan Area Networks," ISBN 0131907379, Prentice Hall, 1996, pp. 233-237; 5 pages.

* cited by examiner

LINEARIZED DIGITAL PHASE-LOCKED LOOP METHOD FOR MAINTAINING END OF PACKET TIME LINEARITY

TECHNICAL FIELD

Embodiments of the present invention pertain to the field of phase-locked loops (PLLs) and, more particularly, relate to linearized digital PLLs.

BACKGROUND

In communications chips, there is usually some kind of clock and data recovery (CDR) circuit, which recovers clock and data signals based on packetized data. As the complexities of the data packets increase and data packet transfer rates increase, the complexity of the state machine logic also increases. The state machine logic must qualify and decode the data packets. This increased complexity makes it difficult to avoid all potential clock glitches.

FIGS. 1 and 2 show conventional CDR technology, for example, as discussed in U.S. Pat. No. 6,535,023. In particular, FIG. 1 shows a block diagram of the conventional CDR circuit and FIG. 2 shows a more detailed view of a conventional digital phase detector and digital filter used in the CDR circuit. Such conventional CDR technology uses relative phase error sampling. Relative phase sampling refers to the use of the clock signal and a number of relative phase signals that are chosen depending on which phase signal is selected as the clock signal at the time of phase error sampling. In order to properly function, relative phase error sampling requires an absolute reference phase in order to start the system and lock on to a new data signal. For example, phase 0 may be chosen from phases 0-7 to serve as the absolute reference phase. In order to use the absolute reference phase at the start of packet (SOP) of a new data packet, the clock is typically reset to the absolute reference phase at the end of packet (EOP) of the previous data packet. Unfortunately, resetting the clock signal at the EOP may cause a clock glitch, or non-linearity, and result in an invalid state in a downstream state machine.

In addition, conventional CDR technology uses only two loop filter modes: acquisition and tracking. Acquisition mode, or high bandwidth mode, refers to the mode in which the conventional CDR circuit initially synchronizes the clock signal with the data signal of a new data packet. Tracking mode, or low bandwidth mode, refers to the mode in which the conventional CDR circuit adjusts the clock signal while the data packet is being received in order to maintain synchronization of the clock signal with the data signal of the data packet. By using only two modes, the conventional CDR circuit reverts from the tracking mode back to the acquisition mode at the EOP, adjusting the clock signal to the absolute reference phase, until a new data packet is detected. Unfortunately, the conventional CDR circuit is unable to implement a hold mode in which the clock signal remains unchanged at the EOP, thus, allowing EOP operations to occur without a clock glitch.

BRIEF DESCRIPTION OF THE DRAWINGS

Embodiments of the present invention are illustrated by way of example and not intended to be limited by the figures of the accompanying drawings, in which.

DETAILED DESCRIPTION

Figure 1:
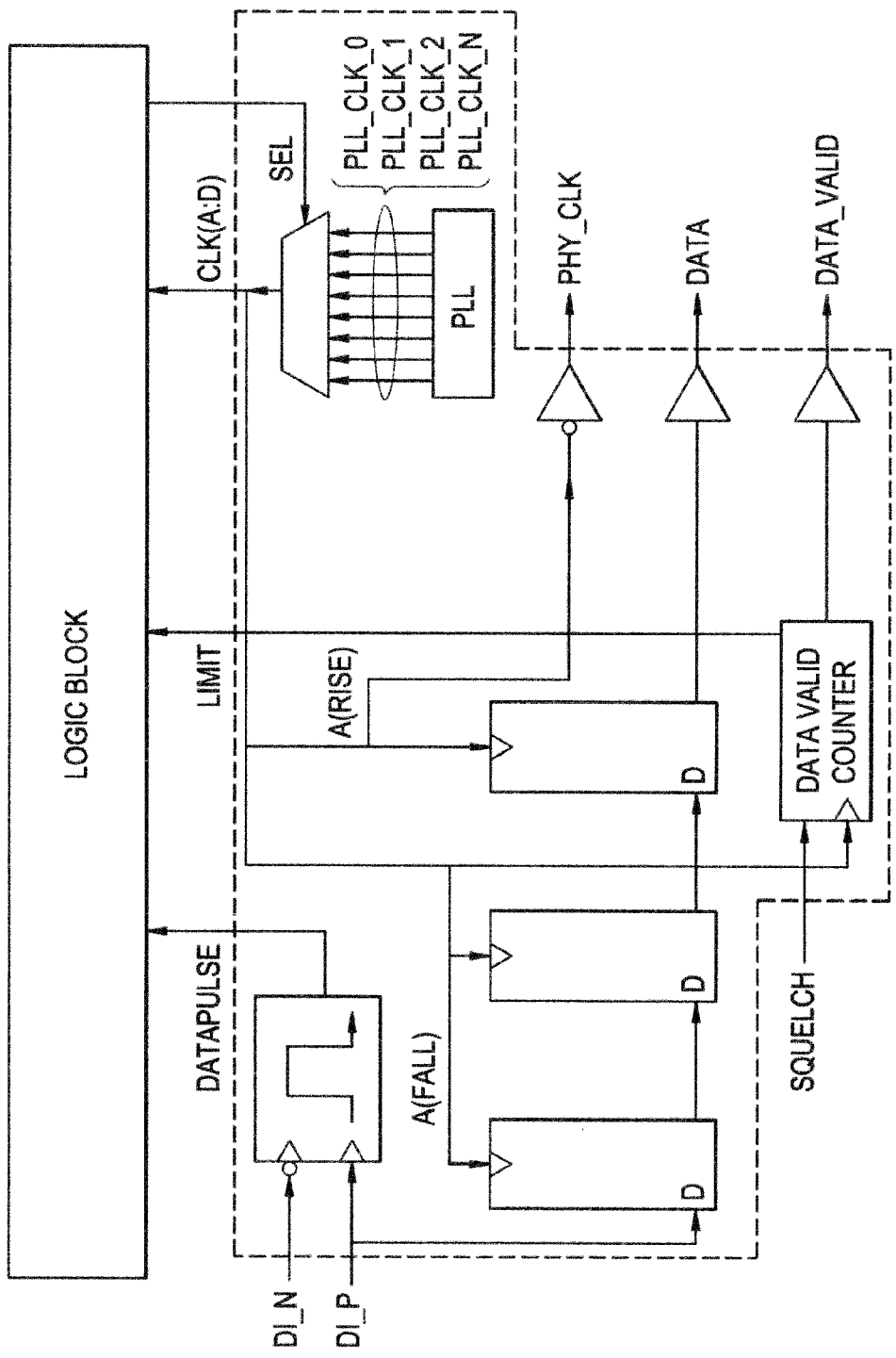
FIG. 1 illustrates a conventional digital phase-locked loop (PLL) system.
Figure 2:
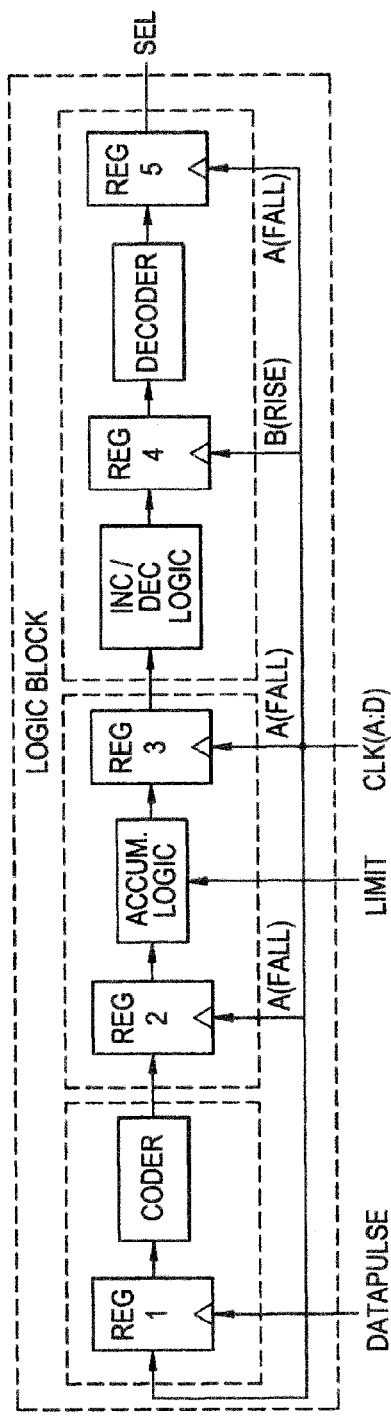
FIG. 2 illustrates a conventional logic circuit implementing a digital phase detector and filter.

In the following detailed description, numerous specific details are set forth in order to provide a thorough understanding of the invention. However, it will be understood by those skilled in the art that certain embodiments of the present invention may be practiced without these specific details. In other examples, well-known methods, procedures, components, and circuits have not been described in detail so as not to obscure the presented embodiments of the invention. It should also be noted that the term "lines" or "bus" as used herein to connect components may be single bit lines, multiple bit lines, or one or more buses. The term "coupled" as used herein means coupled directly to, or indirectly through one or more intervening components (e.g., register).

One embodiment of an apparatus is described for synchronization of a clock signal to a data signal. The apparatus includes a detector that is configured to detect a plurality of values. Each of the plurality of values indicates a position of a data edge of the data signal. The detector also adds the plurality of values to generate a result and to adjust the clock signal if the result is greater than a predetermined value, or threshold. Furthermore, the detector is configured to maintain the clock signal approximately between the end of a first data packet and the beginning of a second data packet.

In general, certain embodiments of the apparatus implement linearized digital phase-locked loops (PLLs) and/or delay-locked loops (DLLs) that maintain time coherency in the synchronized clock when a data packet ends. The synchronized clock also may be referred to as a recovered clock. Digital PLLs/DLLs synchronize a clock signal to an incoming data stream, whereby a time coherent clock is maintained with valid data edge reception.

Typical media data is sent in packetized form, which results in periods of no data edge reception. With no data edges to synchronize to between valid data packets, clock coherency is lost, which adversely affects the recovered clock. In the worst scenario this loss of coherency results in a recovered clock non-linearity. A clock non-linearity is commonly known as a clock glitch. The consequences of a clock glitch can be catastrophic to downstream state machines and, in particular, the state logic engine, which qualifies and decodes the received data packets. One advantage of certain embodiments, therefore, is to maintain the linearity of the recovered clock between periods of valid data transfer, thereby eliminating clock glitches.

One embodiment of the present invention employs absolute phase sampling to allow acquisition from any arbitrarily chose phase to any other phase. Since the phase sampling is absolute there is no requirement for a reference state for acquisition causality. As a result, the valid data packet signal (squelch) can be used to control the bandwidth limitation circuitry with three modes rather than two. The falling edge of squelch can signal the acquisition mode (low bandwidth) commencement. The negative level can signal the tracking mode (high bandwidth). The rising edge/positive level can signal the hold mode (zero bandwidth). The use of these modes and absolute phase error sampling allows the recovered clock to maintain linearity until the next valid packet arrives.

Figure 3:
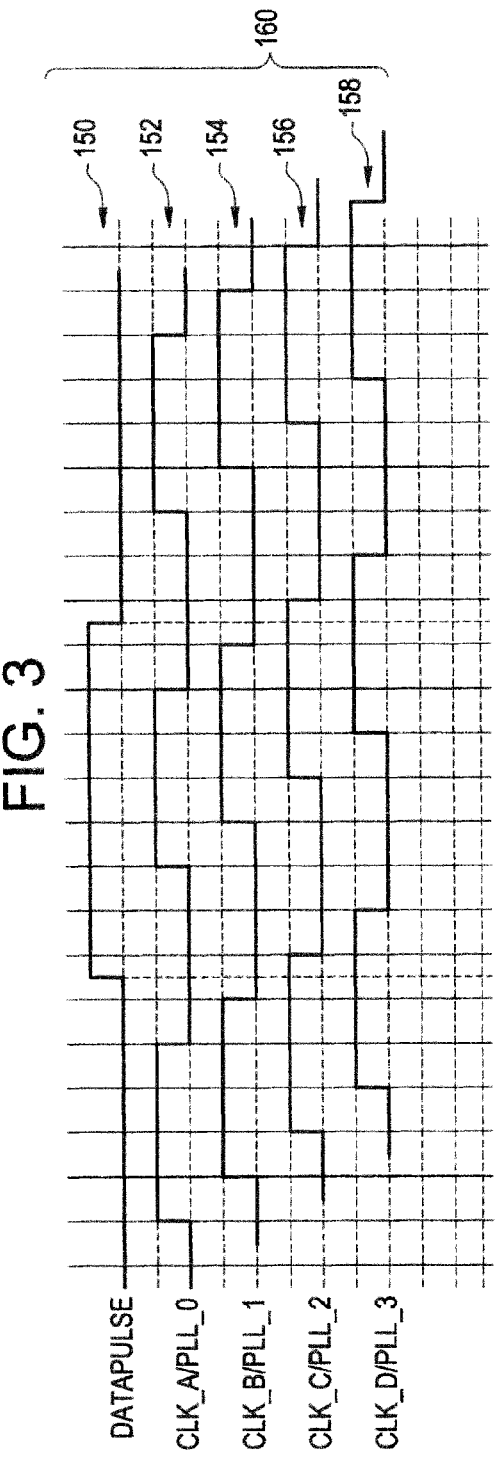
FIG. 3 illustrates a timing diagram of an example data signal and a plurality of sampling phase signals.

FIG. 3 illustrates a timing diagram of an exemplary data signal and sampling phase signals. The timing diagram illustrates a difference between conventional, relative phase sampling and absolute phase sampling. In particular, FIG. 3 includes a datapulse of a data signal 150. A data signal 150 may include one or more datapulses, where each datapulse represents one bit of data or is used in conjunction with other datapulses to represent various amounts of data. The data signal 150, in one embodiment, is received in packetized form.

Four sampling phase signals 152-158 are shown in relation to the data signal 150. Alternatively, fewer or more sampling phase signals 152-158 may be used. In one embodiment, the four sampling phase signals may be out of eight total absolute phase signals with each absolute phase signal offset approximately 45 degrees with respect to the adjacent phase signals (e.g., 0, 45, 90, 135, 180, 225, 270, and 315 degrees). The term absolute, as used herein, refers to the independent nature of a phase signal with respect to the chosen phase clock signal.

As discussed above, the conventional method used relative phase error sampling. In relative phase sampling, the currently chosen phase (clock signal) and the three phases after the currently chosen phase were selected as the sampling phase signals, CLK(A:D), whereby sampling phase error relative to the currently chosen phase made all phase adjustments. While this simplified the phase error coder logic, it came at the expense of requiring a known reference to perform a proper acquisition.

For example, CLK_A represents the currently chosen phase for the clock signal. CLK_B, CLK_C, and CLK_D represent the three phases, respectively, that immediately follow CLK_A. For example if phase 7 is the best phase for data sampling, then CLK_A=phase 7, CLK_B=phase 0, CLK_C=phase 1, and CLK_D=phase 2. A data edge sample relative to this scenario may yield 1100. A high bandwidth load of this phase error would result in an adjustment to phase 2. However, the proper phase load should be a move to phase 1. Although the relative phase error sampling scheme may be suitable for normal tracking adjustments since phase jumps are linear (plus or minus one phase), relative phase sampling breaks down for acquisition adjustments.

Using absolute phase sampling eliminates this issue altogether because the acquisition phase sampling is absolute, instead of relative to the currently chosen phase. For example, a similar phase sample at an acquisition data edge would yield 1100, which may result in selecting phase 2 for the clock signal regardless of the currently chosen phase at the EOP of the previous data packet. Absolute phase samples also may be used for tracking adjustments by comparing the absolute phase samples to the currently chosen phase.

Figure 4:
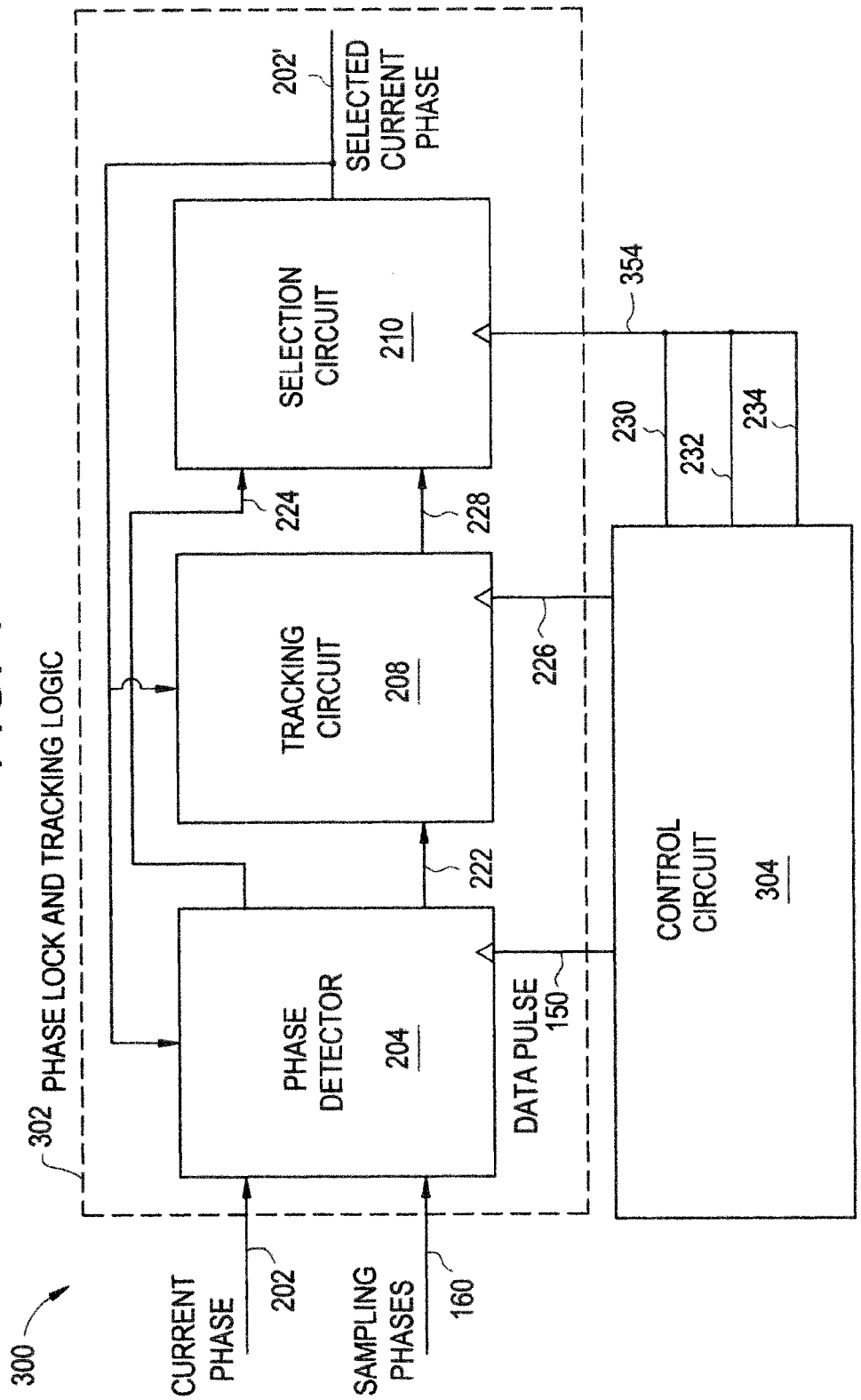
FIG. 4 illustrates a schematic block diagram of one embodiment of a CDR circuit.

FIG. 4 illustrates a schematic block diagram of one embodiment of a CDR circuit 300. The CDR circuit 300 includes a number of circuits that may be combined as shown or in another manner to implement absolute phase sampling. Alternatively, the CDR circuit 300 may include fewer or more circuits, communication channels, inputs, outputs, and so forth. The CDR circuit 300 may receive as inputs a current phase signal 202 and a plurality of sampling phase signals 160. In one embodiment, the clock signal is based on a current phase signal 202. The CDR circuit 300 may include a phase lock and tracking logic circuit 302 coupled to a control circuit 304. The phase lock and tracking logic circuit 302 may include a phase detector 204, a tracking circuit 208 and a selection circuit 210. At least one output of the CDR circuit 300 may be a selected current phase signal 202', which may be used as a new clock signal. Additionally, the selected current phase signal 202' may be fed back as the current phase signal 202 that is input into the CDR circuit 300.

In one embodiment, phase detector 204 may include a multi-bit register (discussed below as REG1 in relation to FIG. 6) configured to detect a plurality of values. Each value indicates a position of an edge. For example, the plurality of values may include a plurality of absolute phase samples of the sampling phase signals 160. In one embodiment, the register of phase detector 204 is clocked by a data signal 220, such as the data signal 150. Furthermore, the register of phase detector 204 may be a double data rate flip-flop that clocks on both the rising and falling edges of the data signal 220.

The phase detector 204 is coupled to the tracking circuit 208 to supply the absolute phase samples acquired from the sampling phase signals 160. In one embodiment, the phase detector 204 generates an acquisition phase signal 224 that corresponds to one of the plurality of absolute phase signals. Additionally, the phase detector 204 generates the acquisition phase signal approximately at a start of packet (SOP) of a data packet. In this way, the phase detector 204 may indicate which absolute phase signal should be used to synchronize the clock signal to the data signal of the data packet. As described above, some degree of non-linearity may be acceptable while circuit 300 operates in acquisition mode. The phase detector 204 also outputs a phase error signal 222 to tracking circuit 208.

In one embodiment, the tracking circuit 208 generates a tracking phase signal 228 that corresponds to a relative linear phase signal with respect to the clock signal. For example, if the clock signal is based on phase 2, the tracking phase signal 228 may indicate that the selected current phase 202' may be 3 (plus 1) or 1 (minus 1). Additionally, the tracking circuit 208 may indicate that the clock signal does not need to be changed. In one embodiment, the tracking circuit 208 is clocked by a clock signal 226, received from control circuit 304, based on the selected current phase 202'. In particular, the tracking circuit 208 may be clocked by the falling edge of the clock signal 226.

In one embodiment, the selection circuit 210 accepts as inputs both the tracking phase signal 228 and the acquisition phase signal 224. The selection circuit 210 also accepts control input from the control circuit 304. Control circuit 304 generates an acquisition control signal and a tracking control signal. In one embodiment, the tracking control signal is complimentary to the acquisition control signal. Additionally, control circuit 304 generates a hold control signal. In one embodiment, the control circuit 304 generates the hold control signal approximately at the EOP of a data packet.

The selection circuit 210 is configured, in one embodiment, to output the selected current phase 202', which may be used to adjust the clock signal in either a non-linear (acquisition) or a linear (tracking) manner. For example, the selection circuit 210 may synchronize the clock signal to a data packet based on the acquisition phase signal 224 in response to an acquisition control signal 230. Synchronizing the clock signal to the acquisition phase signal 224 may occur in either a linear or non-linear manner. By stating that the acquisition mode is non-linear, it is to be understood that non-linearity is not exclusive of linear adjustments. Linear adjustments may be acceptable in a non-linear environment, but non-linear glitches are usually undesirable in a linear environment.

Furthermore, the selection circuit 210 may adjust the clock signal based on the tracking phase signal 228 in response to a tracking control signal 232. However, the selection circuit 210 alternatively may prevent an adjustment of the clock signal in response to a hold control signal 234 from the control circuit 304.

In one embodiment, the control signals 230, 232 and 234 are communicated to the selection circuit 210 via a multi-bit control bus 354 coupled between the selection circuit 210 and the control circuit 304. In an alternative embodiment to the illustrated in FIG. 6, where the acquisition control signal 230 and tracking control signal 232 are complimentary, the multi-bit control bus 354 may be a 2-bit bus. Alternatively, the multi-bit control bus 354 may support more than two bits.

Figure 5:
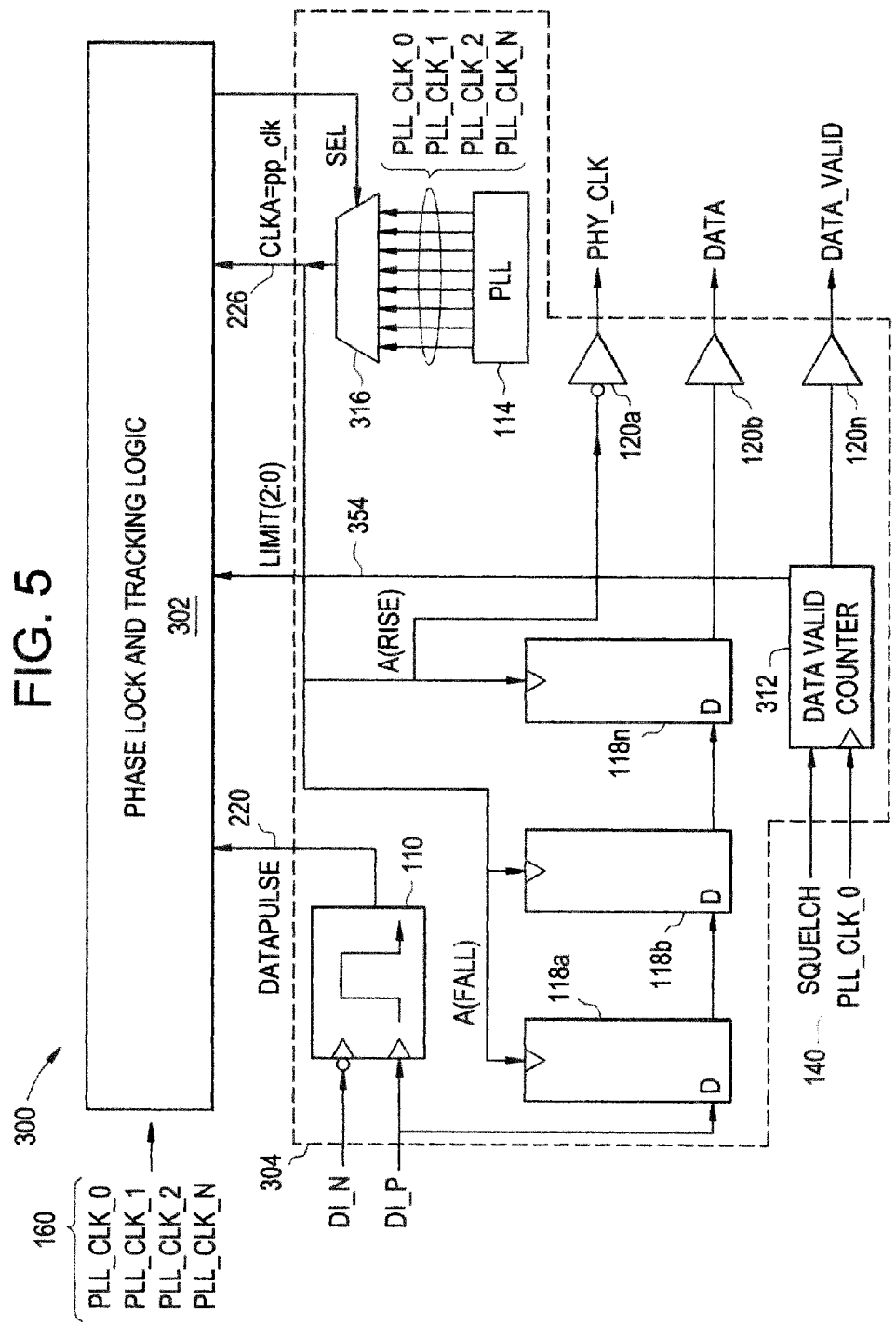
FIG. 5 illustrates a more detailed embodiment of a CDR circuit utilizing an absolute phase error detection technique.

FIG. 5 illustrates a more detailed embodiment of a CDR circuit 300. In this embodiment, the CDR circuit 300 includes phase lock and tracking logic circuit 302 and control circuit 304. On exemplary embodiment of the phase lock and tracking logic circuit 302 is described below with reference to FIG. 6. Referring now to FIG. 5, control circuit 304 is configured to adjust the frequency of an output clock. In one embodiment, control circuit 304 includes an edge detection circuit 110, memory storage elements 118a, 118b, 118n, buffers 120a-120n, counter (shift register) 312, PLL 114 and multiplexer 316.

The edge detection circuit 110 provides a data control signal 220 (e.g., DATAPULSE or DATAEDGE) to the phase lock and tracking logic circuit 302. The data control signal 220 may be generated in response to one or more data signals (e.g., DI_N and/or DI_P). In one example, edge detection circuit 110 may be configured to generate a pulse signal in response to a transition of a data signal, such as the data signal 150.

The PLL circuit 114 provides a number of clock signals (e.g., PLL_0 through PLL N) to the multiplexer 316. Multiplexer 316 provides a current phase signal 226 (e.g., CLKA=pp_clk) to the phase lock and tracking logic circuit 302 based on a SEL control signal received from phase detector 200 as discussed below. Alternatively, the multiplexer 316 may present a plurality of signals to the phase lock and tracking logic circuit 302. The multiplexer 116 may be configured to select a number of the absolute phase signals PLL_0 through PLL_N for presentation as the current phase signal (or "picked phase") in response to the signal SEL. In other words, the control circuit 304 feeds a properly delayed phase (e.g., 0, 1, 2, 3) directly from PLL circuit 114 straight into the phase detector.

The data valid counter 312 generates the acquisition control signal 230 and tracking control signal 232 and the hold control signal 234 on multi-bit bus 354 based on the receipt of the valid data packet signal (squelch) 190 and the clock phase signal PLL_CLK_0. The operation of the memory storage elements 118a, 118b, 118n, and buffers 120a-120n are known in the art; accordingly a detailed discussion is not provided.

Figure 6:
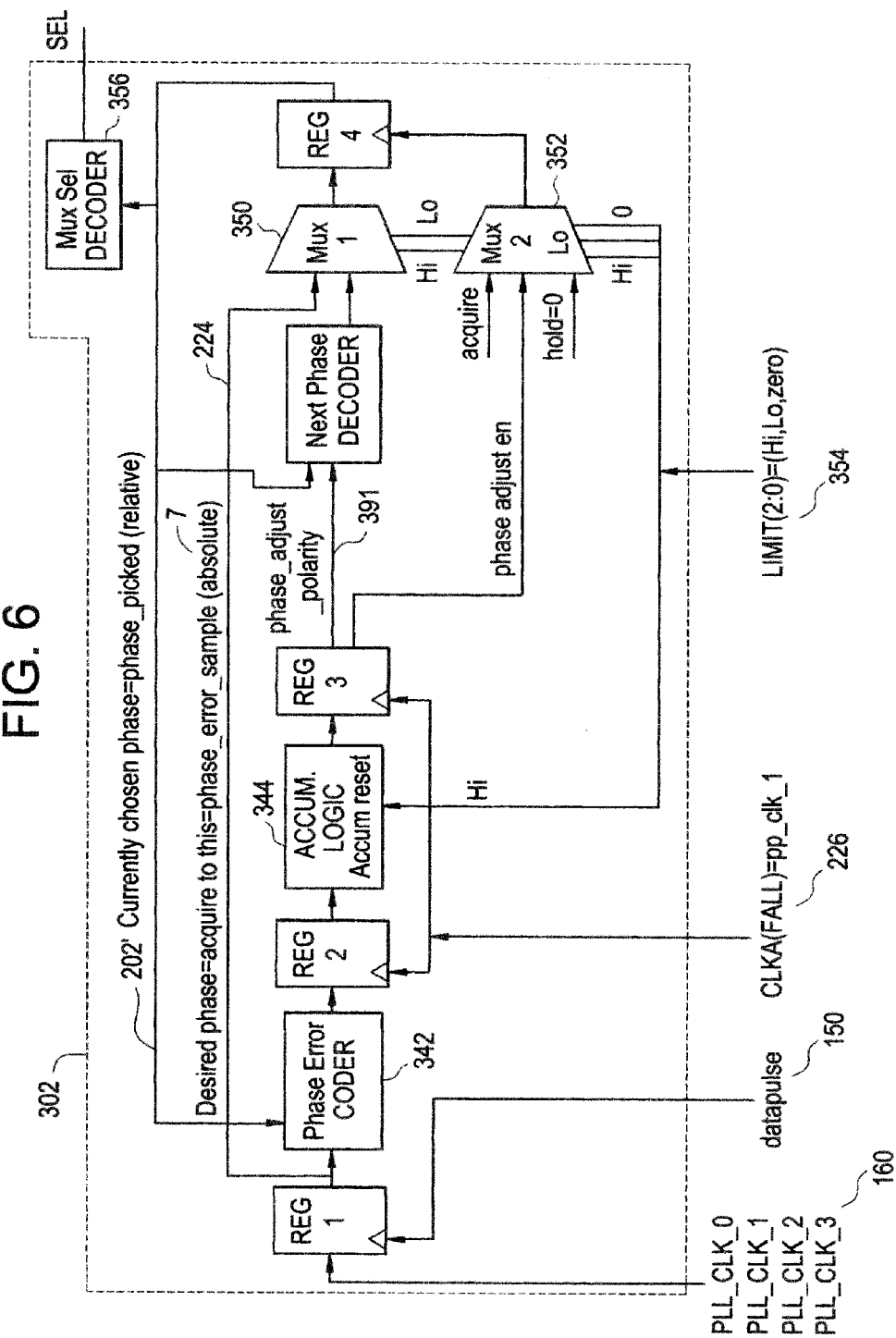
FIG. 6 illustrates a schematic block diagram of one embodiment of a phase detector used in the CDR circuit of FIG. 5.

FIG. 6 illustrates a schematic block diagram of one embodiment of a phase lock and tracking logic circuit 302. The phase lock and tracking logic circuit 302 may be used for linearization of the phase-detection and loop mechanisms of the clock and data recovery circuit. In one embodiment, the phase lock and tracking logic circuit 302 includes a first register REG1, a coder 342, a second register REG2, an accumulator 344, a third register REG3, a decoder 348, a first multiplexer MUX1 350, a second multiplexer MUX2 352, a fifth register REG4, a multi-bit bus 354, and a mux decoder 356. The coder 342 may be implemented by a phase error coder circuit. The accumulator 344 operates as a filter and may be implemented by an accumulation and increment/decrement logic circuit. The decoder 348 may be implemented by a next phase decoder circuit that receives a phase adjusted polarity signal 391 and the selected current phase signal 202'. The Mux Sel decoder 356 may be implemented by a one-of-N (e.g., N=8) selection decoder logic circuit. Alternatively, other hardware and/or software may be used to implement the logic function discussed below with respect to the various components. Moreover, various logic components known in the art may be used to implement the phase detector including, for examples, complementary metal-oxide semiconductor (CMOS), differential FET logic (DFL), current-mode logic (CML), differential cascode voltage switch logic (DCVSL), NMOS/Dominoe/Pseudo-Nmos, etc.

In one embodiment, the phase detector 204 may include REG1 and phase error coder 342. The register REG1 generally receives the data signal 220 DATAPULSE (or DATAEDGE) and sampling phase signals 160 PLL_0-PLL_3 from the control circuit 104. An output of the register REG1 may be presented to an input of the coder 342. The coder 342 also may receive the selected current phase signal 202' as an input. In one embodiment, the coder 342 generates a plurality of values, which may include a first phase error signal and a second phase error signal. The first phase error signal may be based on a relation between a first data edge of a data packet and a plurality of absolute phase signals. Similarly, the second phase error signal may be based on a relation between a second data edge of the data packet and the plurality of absolute phase signals. The coder 342 may output a phase error signal 222 to an input of the register REG2. The register REG2 may have an output, clocked by CLKA 226, that presents a signal to a first input of the accumulator 344.

In one embodiment, the accumulator 344 generates a result. The result may be an accumulation signal based on the first and second phase error signals generated by the coder 342. The accumulator 342 outputs the accumulation signal to the register REG3. In one example, the accumulator 344 may be a simple digital arithmetic accumulator that maintains an accumulated relative error and generates an accumulation signal. The accumulator 344 then may generate a phase modifier signal in response to a determination that the accumulation signal surpasses a threshold, thereby, enabling the adjustment of the clock signal in an indicated direction (e.g., increment/decrement).

The output of the accumulator 344 passes to the decoder 348. In one embodiment, decoder 348 generates the tracking phase signal 228 (e.g., adjusts the clock signal in the indicated, relative direction) based on a comparison of the phase modifier signal and the clock signal. For example, if the clock signal is based on PLL_3 and the phase modifier signal is +1 then the clock signal may be adjusted based on PLL_4. If the tracking phase signal 228 is eventually passed to the Mux Sel decoder 356, the phase of a clock signal may be continually aligned to the incoming data signal to allow a simple sampling arrangement to recover the data bits.

Which signal, if any, is passed from the multiplexer MUX1 350 to the fourth register REG4 depends on the control signals communicated to the multiplexers MUX 1 350 and MUX2 352 via the multi-bit bus 354. In one embodiment, the multi-bit bus 354 is substantially similar to the multi-bit bus 354 of FIG. 4. As described above, the output of the first register REG1 is passed to the fourth register REG4 in response to an acquisition (high bandwidth) control signal 230. The output of the decoder 348 is passed to the fourth register REG4 in response to a tracking (low bandwidth) control signal 232. Alternatively, the multiplexer MUX1 350 may prevent any signal from passing to the fourth register REG4 in the event of a hold (zero bandwidth) control signal 234 from the hold control circuit 216. In this way, the phase lock and tracking logic circuit 302 is a tri-bandwidth detector that may operate in one of three modes: acquisition, tracking, or hold.

Figure 7:
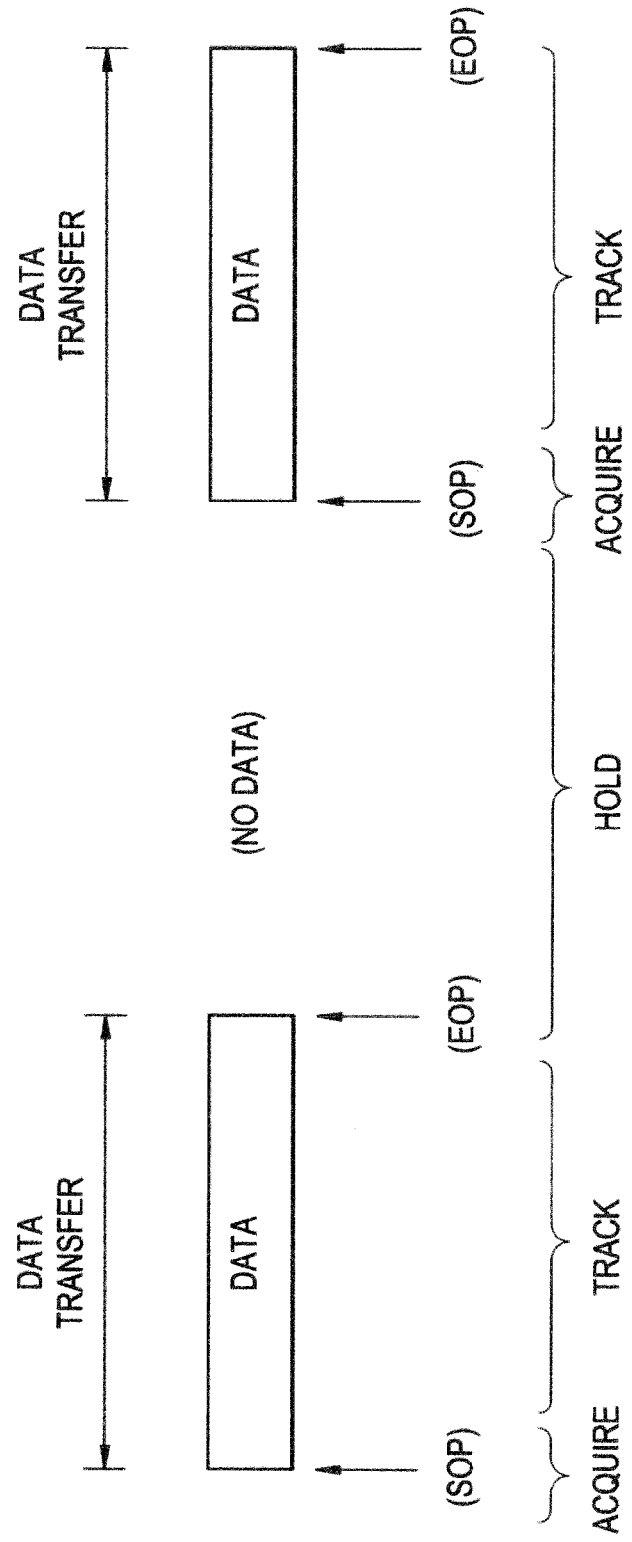
FIG. 7 illustrates an example of an implementation using three bandwidth modes to establish a clock signal for a data signal.

FIG. 7 illustrates an example of an implementation using three bandwidth modes to establish a clock signal for a data signal. At the SOP of a data packet, the acquisition mode may be implemented to initially synchronize the clock signal to the incoming data packet. The initial synchronization may be linear or non-linear. During the remaining data transfer after the initial synchronization, the tracking mode may be implemented to maintain a linear clock signal synchronized to the data packet. For example, the clock signal may be linearly adjusted from one absolute phase signal to the next to maintain the clock signal synchronized with the data packet.

At approximately the EOP of the data packet, the hold mode may be implemented to maintain the clock signal at the last chosen phase signal. Holding the clock signal in this manner allows EOP operations to complete without interruptions from a non-linear adjustment to the clock signal, such as an adjustment to an absolute reference phase. At the beginning of a subsequent data packet, the acquisition mode may be implemented and the cycle repeated, as described above.

Figure 8:
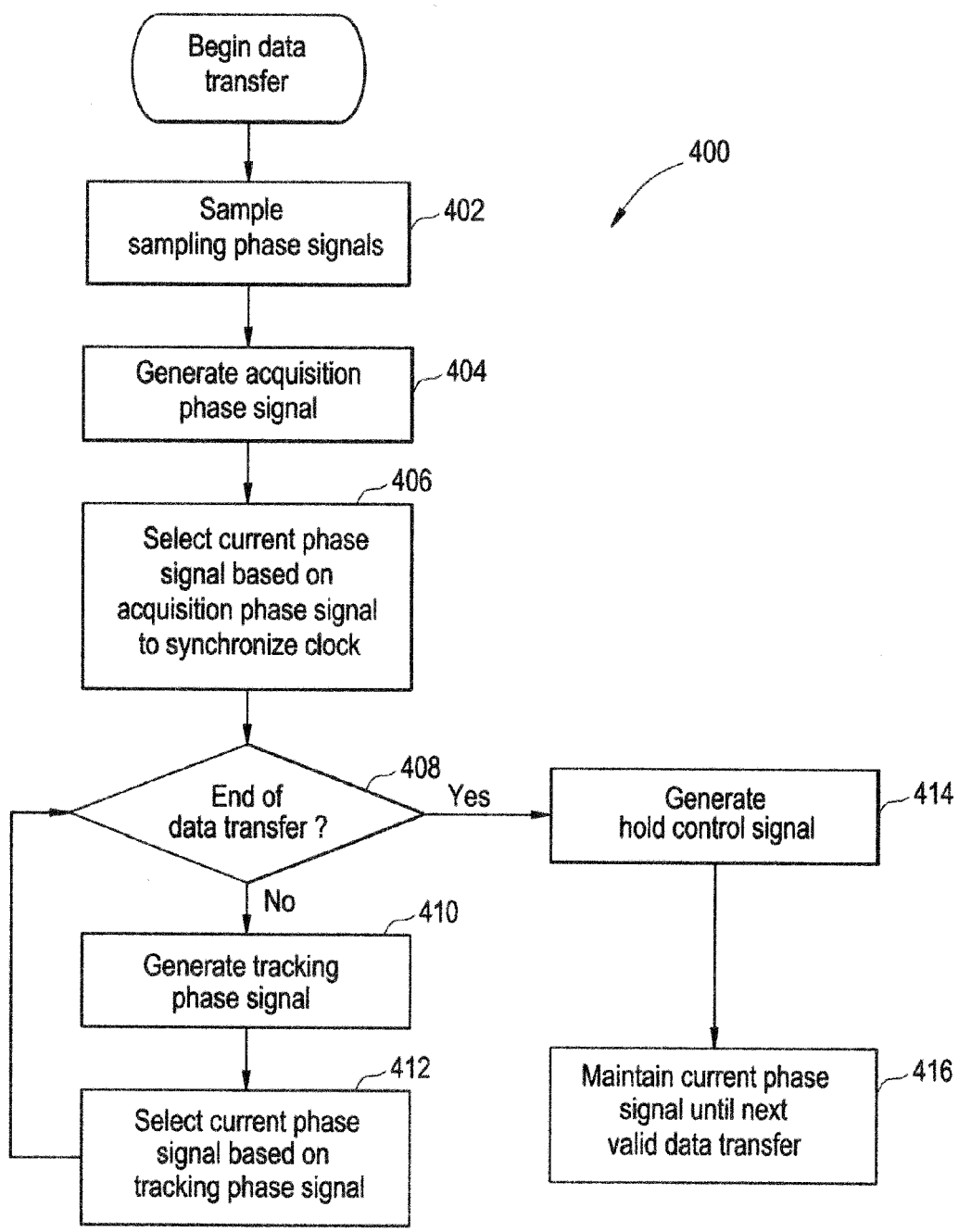
FIG. 8 illustrates a schematic flow chart diagram of one embodiment of a linearized clock and data recovery method.

FIG. 8 illustrates a schematic flow chart diagram of one embodiment of a linearized clock and data recovery (CDR) method 400. The linearized CDR method 400 begins when a period of valid data transfer begins, such as by receiving a data packet. At block 402, the sampling phase signals 160 are sampled with reference to a data edge of the data packet. At block 404, the phase detector 204 generates an acquisition phase signal 224. The selection circuit 210 subsequently synchronizes the clock signal, at block 406, according to the acquisition phase signal 224.

A determination may be made, at block 408, if the data transfer is at the EOP of the data packet. If the data transfer is not at the EOP of the data packet, the tracking circuit 208 generates a tracking phase signal 228, at block 410, and the selection circuit 210 adjusts the clock signal when necessary according to the tracking phase signal 228. The tracking circuit 208 and selection circuit 210 continue to modify the clock signal until the EOP of the data packet. At approximately the EOP of the data packet, the hold circuit 216 generates a hold control signal 234, at block 414, and the selection circuit 210 maintains the clock signal, at block 416, until the next valid data transfer.

Although the foregoing method is shown in the form of a flow chart having separate blocks and arrows, the operations described in a single block do not necessarily constitute a process or function that is dependent on or independent of the other operations described in other blocks. Furthermore, the order in which the operations are described herein is only illustrative, and not limiting, as to the order in which such operations may occur in alternative embodiments. For example, some of the operations described may occur in series, in parallel, or in an alternating and/or iterative manner.

The use of absolute phase error sampling—sampling the known PLL phases in a predetermined order with a data edge—in combination with comparison to the currently chosen phase allows for an arbitrary phase adjustment lock on (high bandwidth acquisition). Since phase error sampling and adjustments are based on absolute sampling the need to return to a known reference phase at EOP is eliminated. As a result, the extra "zero" bandwidth mode can be added which maintains linearity when a valid data stream ends. The "zero" bandwidth mode will hold (via the hold control signal) the recovered clock with the last chosen phase before the EOP, thereby eliminating any non-linear phase adjustment (recovered clock glitches) at the EOP.

It should be noted that the clock and data recovery circuit 300 may be used in a wide variety of systems that operated with packetized data streams. In one embodiment, the clock and data recovery circuit 300 may be used in a transceiver such as for, example, the USB transceiver discussed below with respect to FIG. 9. Alternatively, the clock and data recovery circuit 300 may be used in physical layer devices (PHY) that are used with, for example, line cards in WAN applications to convert packetized data streams from one medium or network type (e.g., Ethernet) to another medium (e.g., optical) or different network type (e.g., SONET) or IEEE1394 (a.k.a., FireWire) devices, etc.

Figure 9:
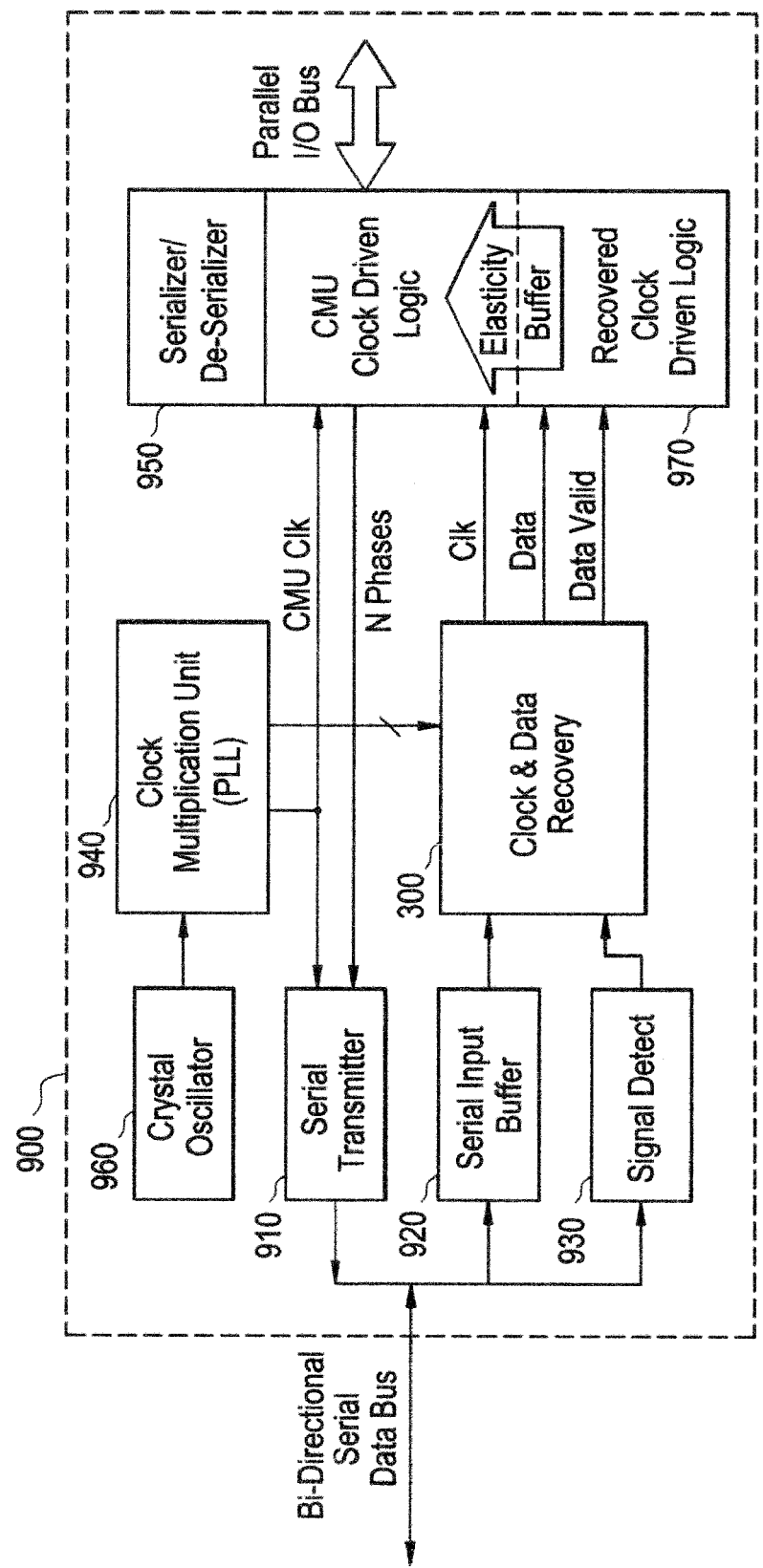
FIG. 9 illustrates a schematic block diagram of one embodiment of a USB transceiver.

FIG. 9 illustrates a schematic block diagram of one embodiment of a USB transceiver having a clock and data recovery circuit. USB transceiver 900 may include a serial transmitter 910, a serial input buffer 920, a signal detect circuit 930, clock and data recovery circuit 300, a clock multiplication unit (e.g., PLL) 940, a serializer/de-serializer (SERDES) 950, clock driven logic 970 and crystal oscillator clock 960.

Serial transmitter 910 is coupled to the clock multiplication unit 940 and the SERDES 950 and operates as clocked output buffer. Serial input buffer 920 receives the input signal and turns it into levels that can be more easily processed. Signal Detect circuit 930 is coupled to receive the input signal from the data bus (e.g., bi-directional serial bus) and detects if there is any activity on the data bus. For USB 2.0 systems, signal detect asserts when |D+−D−|>150 mv and de-asserts when |D+−D−|<=100 mv (and filters de-assertions when D+/D− are crossing each other during normal data transitions). The clock multiplication unit 940 converts the frequency (e.g., in one embodiment, 24 MHz) of the crystal oscillator clock 960 into a higher frequency (e.g., in one embodiment, 480 MHz) clock signal. The clock multiplication unit 940 may be capable of tapping its VCO at each stage to provide multiple phases of the generated higher frequency (e.g., 480 MHz) clock signal.

In one embodiment, the data coming into the transceiver 900 can have a bit rate, for example, up to 1000 ppm different than the 480 MHz clock on the chip. The clock and data recovery circuit 300 may handle recovery of the data even in the presence of other types of distortion (jitter). The SERDES 950 turns a serial stream into parallel data and vice-versa. An elasticity buffer may be used between CMU clock driven logic and recovered clock logic in clock driven logic 970 since data may be received faster than it may be processed (e.g., a sending clock might be at a higher freq than the transceiver clock). Transceiver 900 may be used, for example, in a USB 2.0 microcontroller.

In the foregoing specification, the invention has been described with reference to specific exemplary embodiments thereof. It should be appreciated that reference throughout this specification to "one embodiment" or "an embodiment" means that a particular feature, structure, or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the invention.

It will, however, be evident that the invention is not limited to the embodiments described herein. Various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
a phase lock and tracking logic circuit configured to detect a plurality of values, each indicating a position of an edge, and to add the plurality of values to generate a result; to adjust a clock signal if the result is greater than a predetermined value; to maintain the clock signal approximately between an end of a first data packet and a beginning of a second data packet: said phase lock and tracking logic circuit comprising:
a phase detector to generate an acquisition phase signal including a coder to generate a plurality of values; and
a tracking circuit coupled to the coder to generate a tracking phase signal corresponding to an relative linear phase signal with respect to the clock signal, including, an accumulator coupled to the coder to generate a phase modifier signal in response to a determination that an accumulation signal surpasses a threshold; and a decoder coupled to the accumulator to generate the tracking phase signal based on a comparison of the phase modifier signal and a current chosen phase;
a multi-bit control bus coupled to the phase lock and tracking logic circuit; and
a control circuit coupled to the multi-bit control bus, wherein the control circuit is configured to generate a hold control signal, a tracking control signal and an acquisition control signal, the multi-bit control bus to communicate at least one of the hold control signal, the tracking control signal, and the acquisition control signal to the phase lock and tracking logic circuit, wherein the control circuit comprises:
a multiplexer coupled to the phase lock and tracking logic circuit to select from among a plurality of sampling phase signals and provide a single one of the plurality of phase signals to the phase lock and tracking logic circuit.

2. The apparatus of claim 1, wherein the control circuit is coupled to the phase lock and tracking logic circuit.

3. The apparatus of claim 2, wherein the phase lock and tracking logic circuit further comprises a selection circuit coupled to the control circuit, the selection circuit to prevent an adjustment of the clock signal approximately between the end of the first data packet and the beginning of the second data packet.

4. The apparatus of claim 2, wherein the control circuit is configured to generate the hold control signal approximately at the end of packet (EOP) of the first data packet.

5. The apparatus of claim 1, wherein the plurality of value generated by the coder includes a first phase error signal based on a relation between a first data edge of the first data packet and a plurality of absolute phase signals, and includes a second phase error signal based on a relation between a second data edge of the first data packet and the plurality of absolute phase signals.

6. The apparatus of claim 1, wherein the control circuit is configured to generate a tracking control signal and wherein the phase lock and tracking logic circuit further comprises a selection circuit coupled to the tracking circuit, the selection circuit to adjust the clock signal based on the tracking phase signal in response to the tracking control signal.

7. The apparatus of claim 6, wherein the control circuit is configured to generate an acquisition control signal, wherein the acquisition phase signal corresponds to a data-pulse-sampled one of the plurality of absolute phase signals.

8. The apparatus of claim 7, wherein the selection circuit is configured to select a current phase signal and synchronize the clock signal to a data packet based in response to the acquisition control signal.

9. The apparatus of claim 1, wherein the plurality of values correspond to a plurality of absolute phase samples, the absolute phase samples corresponding to a plurality of sampling phase signals predetermined from a plurality of absolute phase signals.

10. A transceiver comprising the apparatus of claim 1, wherein the apparatus is a clock and data recovery circuit.

11. The transceiver of claim 10, wherein the clock and data recovery circuit is coupled to a serializer/de-serializer.

12. The transceiver of claim 11, wherein the transceiver is a USB 2.0 transceiver.

13. A microcontroller comprising the transceiver of claim 12.

14. A method, comprising:
sampling a plurality of sampling phase signals of a clock signal at a data edge of a data signal and acquiring a corresponding plurality of absolute phase samples, the plurality of sampling phase signals predetermined from a plurality of absolute phase signals;
generating a first phase error signal based on a relation between a first data edge of a first data packet and a plurality of absolute phase signals, and generating a second phase error signal based on a relation between a second data edge of the first data packet and the plurality of absolute phase signals;
generating an accumulation signal based on the first and second phase error signals;
generating a phase modifier signal in response to a determination that the accumulation signal surpasses a threshold;
generating a tracking phase signal corresponding to a relative linear phase signal with respect to the clock signal, the tracking phase signal based on a comparison of the phase modifier signal and the clock signal; generating a tracking control signal and linearly adjusting the clock signal based on a tracking phase signal in response to the tracking control signal if the clock signal deviates from the data signal beyond the threshold; and
maintaining the clock signal approximately between an end of the first data packet and a beginning of a second data packet.

15. The method of claim 14, further comprising generating a hold control signal and preventing an adjustment of the clock signal approximately between the end of the first data packet and the beginning of the second data packet in response to the hold control signal.

16. The method of claim 15, further comprising generating the hold control signal approximately at an end of packet (EOP) of the first data packet.

17. The method of claim 14, further comprising generating an acquisition phase signal corresponding to one of the plurality of absolute phase signals and synchronizing the clock signal to the data signal based on the acquisition phase signal.

18. The method of claim 14, wherein the plurality of absolute phase signals includes eight absolute phase signals and the plurality of sampling phase signals include four consecutive absolute phase signals.

19. An apparatus, comprising:
means for synchronizing a clock signal with a data signal of a first data packet; means for maintaining linearity of the clock signal between an end of the first data packet and a beginning of a second data packet;
means for generating a hold control signal, a tracking control signal and an acquisition control signal, wherein the means for generating comprises:
counter means for generating the hold control signal, the tracking control signal and the acquisition control signal;
means for selecting from among a plurality of sampling phase signals and outputting a single one of the plurality of phase signals to the means for maintaining;
means to generate an acquisition phase signal to generate a plurality of values;
means coupled to the means to generate the acquisition phase signal to generate a tracking phase signal corresponding to a relative linear phase signal with respect to the clock signal;
means to generate a phase modifier signal in response to a determination that an accumulation signal surpasses a threshold; and
means coupled to the means to generate the phase modifier signal to generate the tracking phase signal based on a comparison of the phase modifier signal and a current chosen phase.

20. The apparatus of claim 19, further comprising means for preventing an adjustment of the clock signal approximately at the end of the first data packet in response to a hold control signal.

21. The apparatus of claim 19, wherein the means for synchronizing comprises means for acquiring a plurality of absolute phase samples of the corresponding plurality of sampling phase signals, the plurality of sampling phase signals predetermined from a plurality of absolute phase signals.

* * * * *